United States Patent [19]

Subramanian

[11] Patent Number: 4,900,788
[45] Date of Patent: Feb. 13, 1990

[54] BLOW MOLDING POLYESTER COMPOSITIONS

[75] Inventor: Pallatheri M. Subramanian, Hockessin, Del.

[73] Assignee: E. I. Du Pont de Nemours and Company, Wilmington, Del.

[21] Appl. No.: 132,488

[22] Filed: Dec. 14, 1987

[51] Int. Cl.$^4$ ............................................. C08L 67/02
[52] U.S. Cl. .................................... 525/166; 525/165; 525/176
[58] Field of Search ................... 525/64, 166, 176, 165

[56] References Cited

U.S. PATENT DOCUMENTS

| | | | |
|---|---|---|---|
| 3,005,795 | 10/1961 | Busse et al. | 200/45.5 |
| 3,723,373 | 3/1973 | Lucas | 525/165 |
| 4,034,013 | 7/1977 | Cone | 200/835 |
| 4,240,378 | 1/1981 | Kometani et al. | 525/4 |
| 4,284,540 | 8/1981 | Iida et al. | 200/22 R |
| 4,659,757 | 4/1987 | Okamoto et al. | 523/436 |
| 4,666,972 | 5/1987 | Kohler | 525/166 |

FOREIGN PATENT DOCUMENTS 59-184251 10/1984 Japan.

OTHER PUBLICATIONS

Abstract of J, 52 129759-A, Oct. 31, 1977.
Abstract of J, 54 162750-A, Dec. 24, 1979.

*Primary Examiner*—Patricia Short

[57] ABSTRACT

A blow moldable composition of a polyether, an epoxide polymer, and a fibrillatable tetrafluoroethylene polymer.

3 Claims, No Drawings

BLOW MOLDING POLYESTER COMPOSITIONS

BACKGROUND OF THE INVENTION

Polyesters that are semicrystalline, particularly poly(butylene terephthalate) and poly(ethylene terephthalate), are used extensively in many applications that require good solvent resistance and good properties at elevated temperatures. They are ordinarily processed by injection molding, but there are many articles such as containers which are hollow and to manufacture these by injection molding is very difficult and expensive. Many such articles can conceivably be made by blow molding provided the polymer system has adequate melt strength and viscosity. Unfortunately, polyesters commonly used for injection molding have melt viscosities which are too low to make them suitable for extrusion blow molding. High molecular weight polyesters can be made by solid phase polymerization of polymers suitable for injection molding, but this operation raises the cost of the polyesters substantially. It would be desirable to have blow moldable polyester compositions made from the commercial injection moldable grades of polyesters.

The addition of conventional di- or poly-epoxides and, more recently, the addition of ethylene copolymers containing glycidyl groups have been suggested for increasing the melt strength and viscosity of polyesters (see Kometani et al., U.S. Pat. No. 4,246,378). These solutions to the problem have improved polyesters to a limited extent for blow molding applications but have proved to be inadequate in providing materials suitable for blow molding objects as large as a one-liter bottle when the initial polyester is a typical injection molding resin. Therefore, a need still exists tor blow moldable polyester compositions which are derived from commercial grades of polyesters sold for injection molding.

SUMMARY OF THE INVENTION

In the instant invention the melt strengths and melt viscosities of polyesters are increased substantially by the combination of (1) the addition of an epoxy-containing copolymer and (2) the addition of small amounts of a fibrillatable fluoropolymer resin. In order to achieve the desired melt strength, both the epoxy-containing copolymer and the fibrillatable fluoropolymer resin are required. Neither additive alone in the amounts contemplated provides the processibility required for blow molding.

The compositions are melt blends of mixtures consisting essentially of:

(a) 70-85 parts by weight of a semicrystalline polyester;

(b) 15-30 parts by weight of a copolymer containing epoxide groups; and (c) 0.1-3.0 parts by weight of a fibrillatable fluoropolymer resin.

These compositions have high melt strength and high melt viscosity compared to the base polyester. These properties aid in making the compositions blow moldable. The compositions are processible by extrusion blow molding to make hollow parts, such as containers.

DETAILED DESCRIPTION OF THE INVENTION

The polyester resins useful as component (a) are well known in the art. The polyester resins are usually prepared by melt condensation of one or more dicarboxylic acids with one or more glycols. Usually the glycol is employed in a stoichiometric excess relative to the di-acid.

Among the dicarboxylic acids suitable for preparing polyesters in accordance with the present invention are the aromatic dicarboxylic acids such as terephthalic acid, isophthalic acid, orthophthalic acid, 2,6-naphthalene dicarboxylic acid, 1,5-naphthalene dicarboxylic acid, bis(p-carboxyphenyl)methane, anthracene dicarboxylic acid, 4,4-diphenylether dicarboxylic acid; aliphatic dicarboxylic acids such as adipic acid; cycloaliphatic dicarboxylic acids such as 1,4-cyclohexane dicarboxylic acid and the like; or ester forming compounds thereof.

The glycols suitable for preparing polyesters in accordance with the present invention include aliphatic diols having 2 to 10 carbon atoms such as ethylene glycol, 1,3-propylene glycol, 1,4-butanediol, neopentyl glycol, 1,5-pentanediol, 1,6-hexanediol, decamethylene glycol, cyclohexanediol, and 1,4-cyclohexanedimethanol.

Poly(ethylene terephthalate) and poly(butylene terephthalate) are preferred with the latter being especially preferred. Blends of two or more polyesters may also be used with blends of poly(ethylene terephthalate) and poly(butylene terephthalate) being preferred.

As previously indicated, the polyesters preferred for use in this invention are prepared by melt condensation and are quite suitable for injection molding as such but not for blow molding. Typically, the melt viscosity of those polyesters would be from 4000-7000 poise at 260° C., 102 sec$^{-1}$ for poly(butylene for poly(ethylene terephthalate).

The epoxide group-containing copolymers which serve as component (b) contain recurring units of the monomers:

(1) $CH_2=C(R)COOCH_2CHCH_2O$ wherein R=H or alkyl of 1-6 carbon atoms.

The copolymer will also contain one or more of the following (2) $CH_2=CHR$ where R=H, lower alkyl or phenyl (3) $CH_2=C(R_1)COOR^2$ where $R_1$=H or lower alkyl and $R^2$=alkyl of 1-8 carbons (4) $RCOOCH=CH_2$ where R=lower alkyl (5) CO (carbon monoxide); and include polymers derived from monomers of class (1) with monomers of class (2) either alone or in admixture with monomers of classes (3), (4) and/or (5); and polymers derived from monomers of class (1) with monomers of class (3) either alone or in admixture with monomers of class (4).

Thus, the polymers may be dipolymers derived from one or more monomers of classes (1) and (2) of which ethylene/glycidyl methacrylate copolymers are representative. More preferred are terpolymers containing one or more monomers selected from classes (3), (4) or (5) in addition to monomers from classes (1) and (2). Examples of these terpolymers include polymers of ethylene/vinyl acetate/glycidyl methacrylate and ethylene/alkyl (meth)acrylate/glycidyl methacrylate.

The epoxide group-containing polymers may also be derived from one or more monomers of classes (1) and (3) of which methyl methacrylate/butyl acrylate/glycidyl methacrylate polymers are representative. These polymers may also contain units derived from monomers of class (4), illustrative of which is methyl methacrylate/vinyl acetate/glycidyl methacrylate terpolymer.

The concentration of monomers of class (1), the glycidyl esters, may vary from about 0.5–15% by weight, preferably 1–7% by weight, in the epoxide group-containing polymers described hereinbefore.

Olefin polymers derived from monomer classes (1) and (2) and further containing up to about 40% by weight of units derived from one or more monomers of classes (3), (4) and (5) are preferred. Especially preferred are terpolymers of ethylene containing 10–30% by weight butyl acrylate and 1–7% by weight glycidyl methacrylate.

In order to confer blow moldability to the polyester, while retaining rigidity, the epoxide-containing polymer must be used in amounts of 15–30 parts by weight per 100 parts of components (a) and (b). Preferably 20–25 parts of component (b) are employed. If the epoxide content of component (b) is low, the amount of component (b) used should be on the high side of the ranges given above. Conversely, if the epoxide content of component (b) is high, less of component (b) is required. Twenty parts of a terpolymer containing about 5% by weight of glycidyl methacrylate has been found to give excellent processing in blow molding operations when used in conjunction with component (c), the fibrillatable fluoropolymer resin.

Component (c), the fibrillatable fluoropolymer resin, is preferably a non-melt-fabricable tetrafluoroethylene polymer. The tetrafluoroethylene polymers are made by an emulsion polymerization process, in which the polymer particles formed remain dispersed in the reaction mix during the polymerization. The particles may be coagulated and dried. The particles fibrillate while being physically mixed into the composition of the invention.

The fibrillatable PTFE is a well known material in the art and readily available as a commercial product. The commercially available fibrillatable PTFE is in the form of an aqueous dispersion prepared by the emulsion polymerization or in the form of a powder obtained by separation of the resin from the aqueous dispersion followed by drying. The aqueous dispersion of the fibrillatable PTFE contains usually several tens of %, say, up to 60% of the PTFE particles having a diameter of about 0.2 m while the powdery products are agglomerates of these particles, having a diameter of about 0.5 micrometers. The PTFE particles of either form can be readily converted into fibrils when the particles are subjected to the mechanical shearing forces required to make the present compositions.

Several examples of commercially available fibrillatable PTFE are as follows: Teflon ® 6 J (a product of Mitsui Fluorochemical Co.), Teflon ® 6JC (a product by the same company, Polyflon F-103 (a product of Daikin Kogyo Co.) and Polyflon F-201 (a product by the same company) as the examples of the powdery products and Teflon ® 30-J (a product by Mitsui Fluorochemical Co.) and Polyflons D-1 and D-2 (products by Daikin Kogyo Co.) as the examples of the aqueous dispersion products.

In the compositions of the present invention, the fibrillatable fluoropolymer resin is employed in amounts of 0.2 to 3.0 parts by weight per 100 parts of components (a) and (b). The preferred range is from 0.5 to 1.5 parts by weight.

The ingredients used to make the compositions of the invention are dispersed uniformly and it has been found that melt blending the ingredients, by using such equipment as a melt extruder (e.g. single screw extruders or preferably twin screw extruders), in a separate step prior to blow molding is desirable. The blended product is pelletized (i.e., the extruded strand is quenched and cut), dried and used for subsequent blow molding purposes using an extrusion blow molding machine (e.g., made by Rocheleau Inc., Hayssen Inc., etc.) and fabricated into hollow articles such as containers. Any reactions involving the epoxide groups which may take place are apparently completed during the melt blending operation as evidenced by the increases observed in melt viscosity and melt strength for the resulting melt blend.

Other additives as are known to those familiar with polymer compounding may be included in the composition. These additives include stabilizers, antioxidants, flame retardants, reinforcing agents such as glass fiber and flake, mineral fillers, ultraviolet light stabilizers, etc. Minor amounts of other polymers can also be incorporated in the present compositions. Examples of such polymers include aromatic polyesters (polyarylates) and polycarbonates.

EXAMPLES

Example 1

This example illustrates the preparation of a blow molding PBT resin from poly(butylene terephthlate) (PBT), ethylene/butyl acrylate/glycidyl methacrylate (E/BA/GMA) terpolymer and a fibrillatable Teflon ® fluoropolymer resin.

To 80.5 parts of poly(butylene terephthalate) having a melt index (as measured by ASTM Method D1238 at 240° C. using a 2160 gram weight) of 6–7 gm/10 minutes were added 20 parts of an ethylene/27% n-butyl acrylate/4.9% glycidyl methacrylate terpolymer (EBAGMA) and 1 part Teflon ® 6C, a fibrillatable-type poly-tetrafluoroethylene, 0.1 parts of tetrakis [methylene (3,5-di-tert-butyl-4-hydroxyhydrocinnamate)] methane, an antioxidant (Irganox 1010, Ciba-Geigy) and 0.3 parts bis(2,4-di-t-butylphenyl)pentaerythritol diphosphite (Ultranox 626, Borg Warner). The various ingredients were placed in a polyethylene bag and tumbled to mix. The resulting dry blend was melt blended on a Werner and Pfleiderer twin screw extruder having a diameter of 28 mm and a length to diameter ratio of 27.5. The screw used is a general purpose screw with vacuum capability consisting of conveying elements to convey the feed material from the feed zone to a melting zone in which the material is compressed and melting begins. A section of "kneading blocks" followed by "reverse elements" next provides high shear and pressure to further the melting and mixing processes. The reverse elements serve also to provide a melt seal following which the melt is decompressed in the section under vacuum. Following the vacuum zone, the screw recompresses the melt and passes it through kneading blocks and reverse elements which also serve as a vacuum seal for this side of the vacuum zone. The melt is then further compressed and mixed as it passes through the end of the extruder and out the die. The extruder barrel and die were set at a temperature of 260° C. and the resin extruded at a rate of 16 pounds per hour. Temperature of the melt exiting the extruder die measured at 316° C. The melt strand exiting the extruder was quenched in water and cut into pellets. The pelletized product was dried in a vacuum oven set at 120° C. and purged with a slight nitrogen sweep overnight.

The dried resin was blow molded using an extrusion blow molding machine manufactured by Hayssen, Inc. and a one-gallon bottle mold. The extruded parison showed good strength and one-gallon bottles could be blow molded without difficulty.

Comparative Example A

Following the procedure of Example 1, a blow molding composition is prepared using the same amounts of ingredients used in Example 1 with the exception that the fibrillatable-type poly-tetrafluoroethylene resin is omitted. When the resulting resin was blow molded using the Hayssen machine used in Example 1, the extruded parison showed poor melt strength evidenced by sagging of the parison. Only an occasional gallon bottle having very thin walls could be produced. When the one-gallon mold on the Hayssen machine was replaced by a one-liter mold on a Rocheleau Tool & Die Company extrusion blow molding machine it was possible to make bottles more consistently, but even these smaller bottles had thin walls.

Comparative Example B

Following the procedure of Example 1, a blow molding composition is prepared using the same amounts of ingredients used in Example 1 with the exception that ethylene/butyl acrylate/glycidyl metharcylate terpolymer was omitted. When the resulting resin was blow molded using the Hayssen machine used in Example 1, the extruded parison showed poor melt strength evidenced by sagging of the parison. It was not possible to prepare one-gallon bottles by blow molding this resin.

Comparative Examples A and B demonstrate that the presence of both an epoxide group—containing copolymer and a fibrillatable fluoropolymer resin are required to convert a typical injection moldable polyester resin into a useful blow molding polyester resin.

What is claimed:

1. A melt blend of a mixture consisting essentially of
   (a) 70-85 parts by weight of a semicrystalline polyester;
   (b) 15-30 parts by weight of a copolymer consisting of recurring units provided by
   (1) the monomer

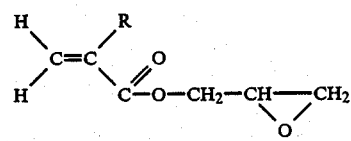

wherein R is hydrogen or alkyl of 1-6 carbon atoms; and one or more monomers selected from the group consisting of
   (2) $CH_2=CHR$ where R=H, lower alkyl or phenyl,
   (3) $CH_2=C(R^1)COOR^2$ where $R^1$=H or lower alkyl and $R^2$=alkyl of 1-8 carbons,
   (4) $RCOOCH=CH_2$ where R=lower alkyl, and
   (5) CO; and
   (c) 0.2-3.0 parts by weight of fibrillatable polytetrafluoroethylene.

2. The composition of claim 1 wherein the polyester is poly(ethylene terephthalate) or poly(butylene terephthalate).

3. A composition of claim 1 where component (a) is poly(butylene terephthalate), and (b) is a terpolymer of ethylene/butyl acrylate/glycidyl methacrylate.

* * * * *